US007967941B2

(12) United States Patent
Nakanishi et al.

(10) Patent No.: US 7,967,941 B2
(45) Date of Patent: Jun. 28, 2011

(54) ADHESIVE-FREE ARAMID-POLYESTER LAMINATE, METHOD OF MANUFACTURING THE SAME AND APPARATUS FOR MANUFACTURING THE SAME

(75) Inventors: Satoru Nakanishi, Yokosuka (JP); Kenichirou Tada, Tokai (JP); Miyoshi Yokura, Otsu (JP); Tetsuo Inoue, Yokkaichi (JP)

(73) Assignees: Hitachi Engineering & Services Co., Ltd., Ibaraki (JP); Kawamura Sangyo Co., Ltd., Mie (JP)

( * ) Notice: Subject to any disclaimer, the term of this patent is extended or adjusted under 35 U.S.C. 154(b) by 0 days.

(21) Appl. No.: 12/019,757

(22) Filed: Jan. 25, 2008

(65) Prior Publication Data
US 2008/0182098 A1    Jul. 31, 2008

(30) Foreign Application Priority Data

Jan. 31, 2007  (JP) ................. 2007-021512

(51) Int. Cl.
*B32B 27/12*   (2006.01)
*B32B 27/36*   (2006.01)
*B32B 37/10*   (2006.01)
*B32B 37/16*   (2006.01)
*B32B 37/22*   (2006.01)

(52) U.S. Cl. ........ 156/299; 156/297; 156/301; 156/302; 156/322; 156/324; 428/304.4; 428/318.4; 428/319.3; 428/319.7; 428/474.4; 428/475.2; 442/295; 442/394; 442/395; 162/146; 162/157.1; 162/157.2; 162/157.3; 162/204; 162/205; 162/206

(58) Field of Classification Search .............. None
See application file for complete search history.

(56) References Cited

U.S. PATENT DOCUMENTS

| | | | | | |
|---|---|---|---|---|---|
| 3,949,455 | A | * | 4/1976 | Biondetti | 492/2 |
| 4,481,060 | A | * | 11/1984 | Hayes | 156/309.9 |
| 4,698,267 | A | * | 10/1987 | Tokarsky | 428/474.4 |
| 4,729,921 | A | * | 3/1988 | Tokarsky | 428/326 |
| 4,815,183 | A | * | 3/1989 | Bondetti | 492/7 |
| 4,858,292 | A | * | 8/1989 | Buhlmann et al. | 492/7 |
| 5,026,456 | A | * | 6/1991 | Hesler et al. | 162/146 |
| 5,124,173 | A | * | 6/1992 | Uchiyama et al. | 427/569 |
| 5,259,306 | A | | 11/1993 | Jenkins | |
| 5,380,180 | A | | 1/1995 | Lamb, Sr. | |
| 5,543,017 | A | * | 8/1996 | Uchiyama et al. | 204/169 |

(Continued)

FOREIGN PATENT DOCUMENTS

EP    1 249 340    10/2002

(Continued)

OTHER PUBLICATIONS

Office Action of JP 2007-021512 dated Jul. 1, 2008 with translation.

(Continued)

*Primary Examiner* — Vivian Chen
(74) *Attorney, Agent, or Firm* — Antonelli, Terry, Stout & Kraus, LLP.

(57) ABSTRACT

A laminate comprising aramid paper containing aramid fiber and aramid pulp and polyester film, the aramid paper and polyester film having been subjected to plasma surface treatment before laminating, wherein the aramid paper and polyester film are continuously bonded to each other. The disclosure is concerned with a process for manufacturing the laminate and an apparatus for manufacturing the laminate.

14 Claims, 2 Drawing Sheets

U.S. PATENT DOCUMENTS

| | | | |
|---|---|---|---|
| 5,895,547 A | | 4/1999 | Kathrein et al. |
| 5,910,231 A | * | 6/1999 | Kirayoglu et al. ............ 162/145 |
| 6,929,848 B2 | * | 8/2005 | Samuels et al. ............... 428/209 |
| 7,335,276 B2 | * | 2/2008 | Kawka et al. ................. 156/324 |
| 7,341,792 B2 | * | 3/2008 | Zinbo et al. ................... 428/480 |
| 2004/0071952 A1 | * | 4/2004 | Anderson et al. ............. 428/327 |
| 2004/0072000 A1 | * | 4/2004 | Kawka et al. ................. 428/515 |
| 2008/0000599 A1 | * | 1/2008 | Yokura et al. ................. 162/146 |
| 2010/0062206 A1 | * | 3/2010 | Tada et al. ...................... 428/80 |

FOREIGN PATENT DOCUMENTS

| | | | |
|---|---|---|---|
| EP | 1 873 307 | | 1/2008 |
| GB | 2 053 026 | * | 2/1981 |
| JP | 63-139707 | | 6/1988 |
| JP | 5-58263 | | 8/1993 |
| JP | 06-305089 | * | 11/1994 |
| JP | 07-32549 | | 2/1995 |
| JP | 7-32549 | | 2/1995 |
| JP | 07-032549 | * | 2/1995 |
| JP | 07-052354 | | 2/1995 |
| JP | 7-299891 | | 11/1995 |
| JP | 08-99389 | | 4/1996 |
| JP | 08-099389 | * | 4/1996 |
| JP | 8-99389 | | 4/1996 |
| JP | 11-209484 | | 8/1999 |
| JP | 2003-246018 | | 9/2003 |
| JP | 2005-068236 | | 3/2005 |
| JP | 2008-007875 | | 1/2008 |
| WO | WO 2004/031466 | | 4/2004 |

OTHER PUBLICATIONS

Office Action of JP 2007-021512 dated Oct. 21, 2008 with translation.

Chinese Office Action of Appln. No. 2008100022645 dated Feb. 5, 2010 with partial translation.

* cited by examiner

ADHESIVE-FREE ARAMID-POLYESTER LAMINATE, METHOD OF MANUFACTURING THE SAME AND APPARATUS FOR MANUFACTURING THE SAME

CLAIM OF PRIORITY

The present application claims priority from Japanese application serial No. 2007-21512, filed on Jan. 31, 2007, the content of which is hereby incorporated by reference into this application.

TECHNICAL FIELD

The present invention relates to a sheet-form, ribbon-form or tape-form adhesive-free aramid-polyester laminate, a method of manufacturing the same and an apparatus for manufacturing the laminate. The laminate is particularly useful for insulating material for electric apparatuses.

BACKGROUND OF THE INVENTION

Aramid fiber is aromatic polyamide fiber known as NOMEX (trade name of du Pont for meta-aramid or m-aramid fiber), which is excellent in electric insulation, heat resistance, anti-chemicals, etc. Accordingly, it has been widely used as an insulating material.

Aramid-polyester laminates wherein aramid papers prepared by mixed-paper making forces of aramid fiber and aramid pulp are laminated and bonded with an adhesive as disclosed in patent documents Nos. 1 to 5.

In patent document No. 1, a prepreg sheet is disclosed wherein plasma-treated aramid films, aramid non-woven cloth and semi-cured adhesive are united. In patent document No. 2, adhesive-free aramid laminate which is prepared by heat bonding aramid paper composed of m-aramid fibrid and heat resistive short fiber and polyethylene terephthalate film at 220 to 250° C. under a pressure of line pressure of 50 kg/cm or higher.

In patent document No. 3, there is disclosed a method of manufacturing aramid-polyester laminate wherein molten polyester is impregnated into aramid paper. In patent document No. 4, there is disclosed a method of manufacturing a laminate sheet by calendar treatment of m-aramid paper and polyester film.

The technology disclosed in patent document No. 1 has such problems that coating of adhesive or adhesive tape is necessary, and treatment of volatile solvent in the adhesive is necessary. In the technology disclosed in patent document No. 5 the prepreg is prepared by impregnating thermosetting resin into aramid fiber, wherein the thermosetting resin is a kind of adhesive.

On the other hand, technologies disclosed in patent document Nos. 2, 3 and 4 do not use adhesive, but polyester film or sheet and aramid fiber or aramid paper are laminated, then the polyester is melted and impregnated into the aramid fiber or aramid paper. In order to melt the polyester, the polyester must be heated at a temperature higher than a glass transition temperature. Accordingly, the cooled polyester re-crystallizes to decrease its elasticity.

(Patent document 1) Japanese patent laid-open 2003-246018
(Patent document 2) Japanese patent laid-open 07-032549
(Patent document 3) Japanese patent laid-open 07-299891
(Patent document 4) Japanese patent laid-open 08-099389
(Patent document 5) Japanese patent laid-open 11-209484

SUMMARY OF THE INVENTION

Accordingly, it is an object of the present invention to provide an aramid-polyester laminate without using an adhesive, which is featured by maintaining characteristics of polyester, flexibility of polyester and making ecological treatment of the production easy.

The present invention provides an adhesive-free aramid-polyester laminate comprising a plasma surface-treated aramid paper formed from aramid fiber and aramid pulp and plasma surface-treated polyester film wherein the aramid paper and the polyester are laminated and bonded using a pressure roll device preferably at room temperature to 200° C. The present invention is featured by that the plasma-treated aramid paper and plasma treated polyester film are directly laminated and bonded without using any adhesive (in the absence of an adhesive). The plasma treated aramid paper and plasma treated polyester film have some chemically active groups which assist the direct bonding therebetween.

The present invention also provides a method of manufacturing an adhesive-free aramid-polyester laminate which comprises plasma surface-treated aramid paper and a plasma surface-treated polyester film are directly laminated and bonded at a temperature of room temperature to 200° C. under a line pressure of 200 kgf/cm or more.

The present invention further provides an apparatus for manufacturing the adhesive-free (adhesive-less) aramid-polyester laminate, which comprises means for unwinding a plasma-surface treated aramid paper; means for unwinding plasma surface-treated polyester film; means for laminating and bonding aramid paper and polyester film by imparting pressure the laminated aramid paper and polyester film; means for detecting and controlling the pressure of the laminating and bonding means; means for winding the laminated and bonded body; and means for detecting and controlling the unwinding speed and/or the winding speed.

REFERENCE NUMERALS IN THE DRAWINGS ARE

Figure 1:
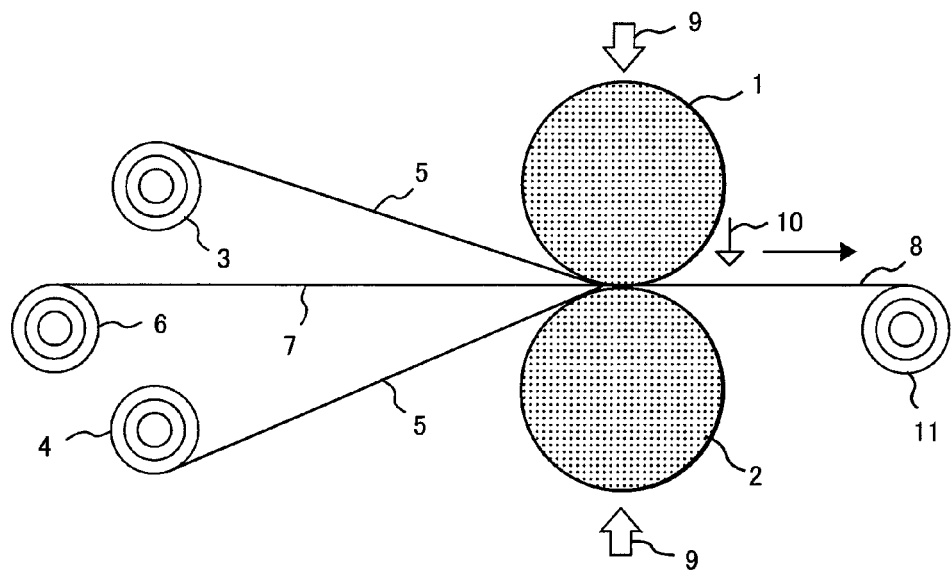
FIG. 1 shows a diagrammatic view of a laminating-bonding apparatus according to an embodiment of the present invention.

1,2; pressing rolls, 3,4; aramid paper reel, 5; aramid paper, 6; polyester film reel, 7; polyester film, 8; laminate, 9; pressing down device, 10; speed detector, 11; winding reel, 12; pre-heating-slow cooling zone, 13; flexure compensating apparatus of roll bending type, 14, 15; roll shafts, 18; temperature controlling device.

DETAILED DESCRIPTION OF THE PREFERRED EMBODIMENTS

According to the preferred embodiments of present invention, it is possible to realize an aramid laminate, a method of manufacturing the same and an apparatus for manufacturing the same, without using an adhesive and without losing flexibility of polyester, and to provide an ecology compliant type aramid laminate.

Preferred Embodiment of the Present Invention

In bonding faces of the aramid paper-polyester laminate the aramid paper and polyester film are directly in contact with each other. According to observation with a microscope, a very thin interface of several nm thick is found at the contact faces. That is, it is thought that a surface layer formed of porous aramid paper and the surface layer of polyester film are directly and continuously bonded in the absence of an adhesive. The word "continuously" is used to means that there may not be a clear bonding line (interface) between the aramid paper and polyester film, which is found in case of adhesive bonding. Although it has not been sufficiently elucidated that the interface layer has what structure and has what function, this can be one of features of the aramid paper-polyester laminate of the present invention.

Though thicknesses of the aramid paper and polyester film are not limited particularly, when the aramid paper is used as sheet, tape or ribbon form insulating material, the aramid paper should have a thickness of 30 to 150 μm and the polyester film should have a thickness of 100 to 200 μm are practical. A total thickness of three layers is preferably 130 to 350 μm.

In the aramid paper-polyester laminate, the temperature for pressing the laminate should preferably be a temperature lower than a glass transition temperature of the polyester film. If the heating temperature is higher than the glass transition temperature, polyester in the laminate re-crystallizes when the polyester is cooled down to loose flexibility and become fragile. As a result, the handling of the laminate becomes worse and properties thereof become worse, too.

A laminate of a three-layered structure comprising aramid paper, polyester film and aramid paper is preferable. Further, the polyester film should be polyethylene terephthalate (PET) or polyethylene naphthalate (PEN) in view of mechanical strength, flexibility, cost, electrical insulation, etc.

The temperature for pressing the laminate should be a temperature lower than a glass transition temperature of polyester film. If the temperature is higher than the glass transition temperature of polyester, flexibility of the laminate will be lost by re-crystallization at the time of cooling thereof. As example of PEN, there is TEONEX, which is a trade name of Teijin•Du Pont Corp. This is a two axes extension polyethylene naphthalate. The glass transition temperature of PET is about 78° C. and that of PEN is about 121° C.

Aramid paper secures electrical insulating properties, chemical stability and heat resistance, and polyester secures flexibility and impermeability to gas and liquid. Aramid papers are arranged on both faces and polyester is used as a core material. As mentioned earlier, preferable materials for the polyester core are polyethylene terephthalate and polyethylene naphthalate.

The rolls for pressing the laminate should be made of rigid (high rigidity) material. In the conventional methods a combination of a rubber roll and a metal roll has been used, but the rubber roll is deformed in its pressing face so that a sufficient pressing force is not exerted on the laminate. When a pair of metal rolls that are more rigid than the rubber rolls are used, a sufficient pressing force can be exerted on the laminate.

In the method of manufacturing the adhesive-free aramid-polyester laminate, the rolls are equipped with a flexure compensating device of a roll bending type, whereby an amount of flexure of the rolls can be adjusted.

Even if the metal rolls are rigid, the rolls may be slightly deformed in their pressing faces that sandwich the laminate. As a result, there are problems such as insufficient pressurizing force or a partially biased pressure to the laminate. In order to compensate or correct the flexure and to apply a sufficient pressurizing force, it is desirable to install the roll bending type flexure compensating mechanism.

It is preferable that at least the rolls are disposed in an atmosphere where the temperature is controllable. In order to keep a desired temperature of at least a means for pressure-laminating the laminate, a temperature control device equipped with a pre-heating zone and a slow cooling zone. Although the lamination and bonding may be done at room temperature, it is preferable to keep the polyester film at a temperature higher than room temperature but lower than the glass transition temperature of the polyester so as to increase a bonding speed and sufficiently lower the pressurizing force.

In the manufacturing apparatus for the adhesive-free aramid-polyester laminate, the laminating-bonding means should preferably be a pair of rolls. The rolls are provided with the roll flexure compensating device of roll bending type thereby to compensate or correct the flexure of the rolls. Further, the lamination bonding means should preferably be within a means wherein the temperature is controllable. In addition, the flexure compensating mechanism of the roll bending type should preferably be constituted to impart independent or different compensation amounts to right shaft and/or left shaft of the rolls.

In the present invention the plasma treatment is a chemical plasma treatment using direct current or alternating current high frequency carried out in vacuum or various atmospheres, that include corona discharge (approximately in atmospheric pressure) and glow discharge (vacuum under reduced pressure). According to the plasma treatment, aramid paper or polyester film or sheet is subjected to surface modification to thereby form some types of functional groups such as COOH or OH groups in the surface of the aramid paper and polyester film. As a result of the surface modification it is possible to strongly bond the aramid paper and polyester film at a temperature of 200 degrees Celsius or lower. This phenomenon is a very peculiar one and cannot be presumed from the description of the above-mentioned patent documents. Since the plasma treatment itself is has been well known as a method of increasing bonding property of different resins, the detailed explanation on this technology is omitted.

In the following the present invention will be explained based on embodiments by reference to drawings. FIG. 1 shows a diagrammatic view of a bonding apparatus for a laminate. In the apparatus shown in the drawing aramid paper 5 unwound from reels 3, 4 for aramid paper and polyester film 7 unwound from reel 6 for polyester film are laminated in three layers (sandwich structure). The laminate is pressurized and bonded by the rolls without an adhesive. The surfaces of the aramid paper and the polyester films were surface treated by plasma treatment in advance.

In order to detect and to compensate or control a pressure of the rolls there is disposed a pressure device 9 with a control device. It is preferable to set a pressure of 200 kgf/cm as a line pressure or more, particularly 300 kgf/cm or more. A rotating speed of the rolls is set by controlling the rotating speeds of the winding-out shaft and winding shaft so as to give a constant tension force to the film and paper at positions of back and forth of the film and paper.

For a more accurate speed control, a transfer speed of the laminate by the rolls is detected with a detector and the detected speed may be feed-backed to the roll rotating speed. A transfer speed optimum for production of the laminate may change depending on the pressure force and temperature. The higher the pressure force and higher the temperature, the higher the transfer speed will become. Depending on the transfer speed, the pre-heating temperature or the roll temperature may be set to 50 to 100° C. higher than the glass transition temperature. However, the temperature of the polyester film should be controlled not to be heated up to the glass transition temperature. The laminate 8 wound by the winding reel 11 is a product.

Conditions for the roll type laminating-bonding apparatus are a homogeneous load over the width of the laminate and constant temperature in the surface of the rolls (directions in width and circumference). In order to achieve the conditions, it is preferable to utilize rolls with high precision (high cylindricity, high circularity, small deflection, etc), the roll flexure compensation mechanism, and a surface temperature control mechanism (for example, the use of heating medium circulating roll).

Figure 2:
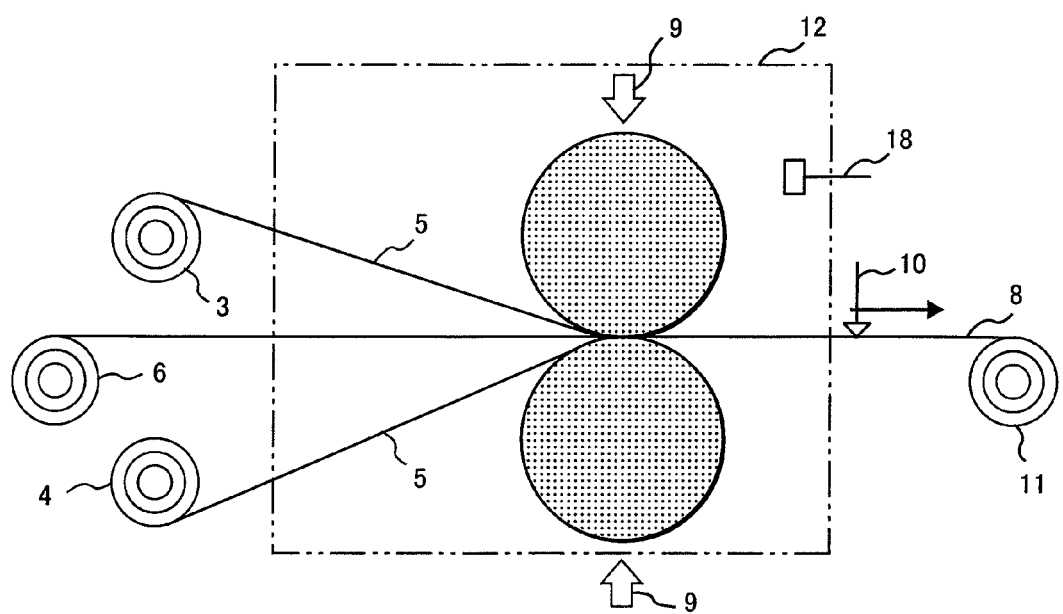
FIG. 2 shows a diagrammatic view of a laminating-bonding apparatus according to another embodiment of the present invention.

FIG. 2 shows a laminating-bonding apparatus according to another embodiment, wherein the same reference numerals as in FIG. 1 designate the same elements. FIG. 2 differs from FIG. 1 in disposition of rolls that are arranged in a pre-heating slow cooling zone 12. According to this apparatus, the films and paper are pre-heated and slowly cooled so that quick heating and rapid cooling of the films and paper can be avoided to thereby prevent wrinkles, etc due to quick heating and rapid cooling of the films and paper.

In addition to that, there may be a case where the films and paper cannot be heated sufficiently to heat them to a desired temperature by contacting them with the rolls because the contact time is short. The pre-heating and slow-cooling zones carry pre-heating them to compensate necessary heat to thereby increase productivity. A control device 18 for detecting temperature of the pre-heating and slow-cooling 12 is disposed. In FIGS. 1 and 2, the roll pressing down device 9 is shown above the rolls for illustration, but the roll pressuring down device 9 is actually fixed to the supporting member of the roll shaft.

In the present embodiment a pair of rolls should preferably be made of more rigid (high rigidity) iron base materials, but an intermediate portion of the rolls may be bent at the time of lamination and bonding so that a sufficient pressure force cannot be given to the laminate or biased pressure force may be given to the laminate. In order to solve this problem, a roll bending compensation mechanism 13 is provided in addition to the roll pressure device 9 to change or correct a roll profile within a short time. An example of this method is shown in FIG. 3.

Figure 3:
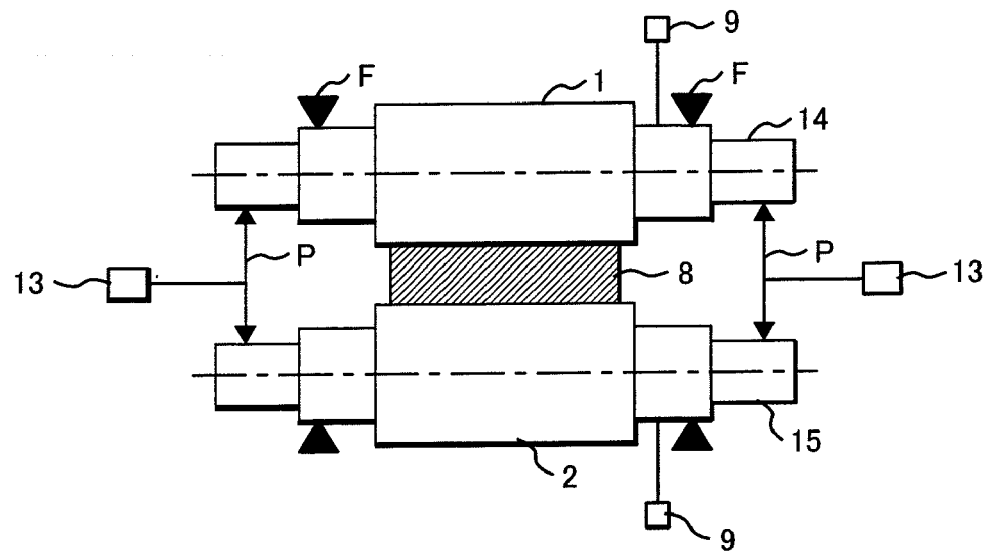
FIG. 3 is a diagrammatic view for explaining a roll-bending compensation of the embodiments of the present invention.
Figure 4:
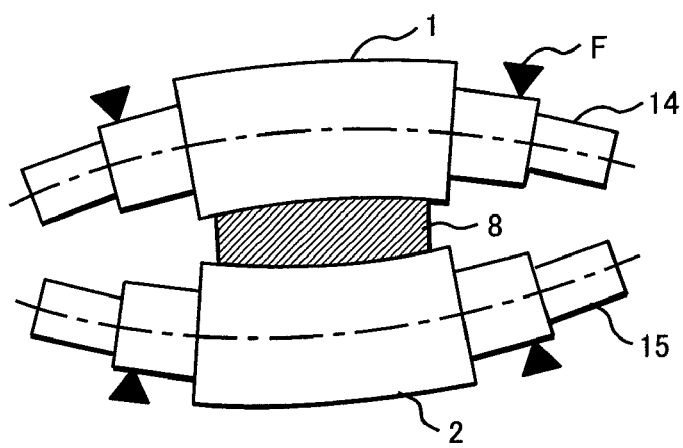
FIG. 4 is a drawing for explaining a roll flexure.

In FIG. 3 a pressure force F is imparted to shafts 14, 15 of the rolls 1,2. On the other hand, in order to prevent such a case where a constant and sufficient pressure force is not imparted to the laminate 8 because the shafts 14, 15 of the rolls 1, 2 sandwich the laminate 8 to bend to be curved as shown in FIG. 4, a pressure P is imparted to the shafts from an opposite direction of the pressure force F. This method is called a roll bending compensation. The roll bending compensation should preferably be done independently with respect to the right and left pressure down devices.

Table 1 and Table 2 show different conditions in the embodiments according to the present invention and characteristics of laminates produced under the above conditions. Aramid papers having thicknesses of 50 μm and 130 μm that have been subjected to the low temperature plasma Surface treatment and PEN having a thickness of 125 μm were laminated and bonded with the apparatus shown in FIG. 2 to produce laminates of a three-layered sandwich structure of aramid-PEN-aramid under the conditions shown in Table 1 and Table 2.

The produced laminates of adhesive-less aramid-polyester exhibited characteristics shown in the evaluation columns. According to evaluation of peeling-off, when PEN is used as polyester film, the roll temperature of 121 degrees Celsius or lower, which is lower than the glass transition temperature of polyester, particularly 110 to 40 degrees Celsius is preferable. A roll line pressure for the laminates of 300 kgf/cm or more, particularly 400 kgf/cm or more is preferable. If the pressure is too high, the process is not economical. Thus, the line pressure should be 1000 kgf/cm or less.

The roll unwinding speed (a withdrawing speed of paper or film from a reel) may vary on the roll temperature and line pressure. The speed may be determined according to the productivity and cost of the laminates. IN the examples shown in Tables, the speed of 0.5 m/min or more, particularly 1 to 20 m/min is preferable.

According to the evaluation of sticking property of laminates, laminates of examples 3, 6-10 and 13-16 showed particularly good sticking property. These laminates are laminated and bonded under proper transfer speeds and proper line pressures at proper temperatures.

In the following, marks are defined as follows.

*1; aramid paper-PEN-aramid paper (aramid paper: type 411 (m-aramid), which is subjected to calendar treatment)
*2; aramid paper-PEN-aramid paper (aramid paper: type 410 (m-aramid), which is not subjected to calendar treatment)
D; the paper of film is easily peeled-off
C; the paper or film is peeled-off.
B; good sticking
A; excellent sticking

TABLE 1

|  | Comp. Ex. 1 | Ex. 1 | Ex. 2 | Ex. 3 | Comp. Ex. 2 | Ex. 4 | Ex. 5 | Ex. 6 | Ex. 7 | Ex. 8 |
|---|---|---|---|---|---|---|---|---|---|---|
| Materials | *1 | *1 | *1 | *1 | *2 | *2 | *2 | *2 | *2 | *2 |
| Thickness of aramid paper (μm) | 50 | 50 | 50 | 50 | 130 | 130 | 130 | 130 | 130 | 130 |
| Roll temp. (degrees Celsius) | 110 | 110 | 110 | 110 | 100 | 100 | 100 | 100 | 100 | 100 |

TABLE 1-continued

|  | Comp. Ex. 1 | Ex. 1 | Ex. 2 | Ex. 3 | Comp. Ex. 2 | Ex. 4 | Ex. 5 | Ex. 6 | Ex. 7 | Ex. 8 |
| --- | --- | --- | --- | --- | --- | --- | --- | --- | --- | --- |
| Transfer speed of laminate (m/min) | 0.5 | 0.5 | 0.5 | 0.5 | 0.5 | 0.5 | 0.5 | 0.5 | 0.5 | 0.5 |
| Roll line pressure (kgf/cm) | 100 | 210 | 300 | 400 | 100 | 210 | 250 | 300 | 500 | 750 |
| Sticking property | D | C | B | A | D | C | B | A | A | A |

TABLE 2

|  | Ex. 9 | Ex. 10 | Comp. Ex. 3 | Ex. 11 | Ex. 12 | Ex. 13 | Ex. 14 | Ex. 15 | Ex. 16 |
| --- | --- | --- | --- | --- | --- | --- | --- | --- | --- |
| Material | *2 | *2 | *2 | *2 | *2 | *2 | *2 | *2 | *2 |
| Thickness of aramid paper (μm) | 130 | 130 | 130 | 130 | 130 | 130 | 130 | 130 | 130 |
| Roll temp. (degrees Celsius) | 100 | 100 | 50 | 50 | 50 | 50 | 50 | 50 | 50 |
| Transfer speed of laminate (m/min) | 0.5 | 0.5 | 0.5 | 0.5 | 0.5 | 0.5 | 0.5 | 0.5 | 0.5 |
| Roll line pressure (kgf/cm) | 1000 | 500 | 100 | 210 | 250 | 300 | 500 | 750 | 1000 |
| Sticking property | A | A | D | C | B | A | A | A | A |

In Table 1 and Table 2, though the roll temperatures of the pressing rolls are set forth 50 to 110° C., which is lower than the glass transition temperature of polyester film (PEN), polyester film does not cause glass transition (particularly, changes such as melting or flowing of the film). The fact that aramid paper and polyester film are strongly bonded under these conditions would not have been expected. In this point, the present invention principally differs from the technologies disclosed in Patent documents No. 2 to 4.

As having been described, the present invention provides a laminate of aramid paper-polyester film having excellent sticking property without using an adhesive.

What is claimed is:

1. A method of manufacturing an adhesive-free laminate of an aramid paper and a polyester film, comprising the following steps:
   providing an aramid paper comprising aramid fibers and aramid pulp, the aramid paper having been subjected to a plasma surface treatment;
   providing a polyester film that has been subjected to a plasma surface treatment; and
   laminating and bonding the aramid paper and the polyester film at room temperature to 200° C. under a line pressure of 200 kgf/cm or higher with a pair of pressing rolls.

2. The method according to claim 1, further comprising providing a second aramid paper comprising aramid fibers and aramid pulp, the second aramid paper having been subjected to a plasma surface treatment, and wherein the step of laminating and bonding comprises laminating and bonding the aramid paper and the second aramid paper to opposed sides of the polyester film to provide a laminate that has a three-layered structure of aramid paper-polyester film-aramid paper.

3. The method according to claim 1, wherein the polyester is polyethylene terephthalate or polyethylene naphthalate.

4. The method according to claim 1, wherein the rolls are made of rigid material.

5. The method according to claim 1, wherein the rolls have a flexure compensating device of roll bending type, thereby to compensate flexure of the rolls.

6. The method according to claim 1, wherein at least the rolls are placed in an atmosphere in which temperature is controllable.

7. The method according to claim 1, wherein the aramid paper comprises m-aramid fibers and m-aramid pulp.

8. A method of manufacturing an adhesive-free laminate of an aramid paper and a polyester film, comprising the following steps:
   providing an aramid paper comprising aramid fibers and aramid pulp, the aramid paper having been subjected to a plasma surface treatment;
   providing a polyester film that has been subjected to a plasma surface treatment; and
   laminating and bonding the aramid paper and the polyester film at room temperature to 200° C., wherein the temperature for laminating and bonding is not higher than the glass transition temperature of the polyester film, under a line pressure of 200 kgf/cm or higher with a pair of pressing rolls.

9. A method of manufacturing an adhesive-free laminate of an aramid paper comprising m-aramid fibers and m-aramid pulp and a polyester film, comprising the following steps:
   providing an aramid paper comprising aramid fibers and aramid pulp, the aramid paper having been subjected to a plasma surface treatment;

providing a polyester film that has been subjected to a plasma surface treatment; and laminating and bonding the aramid paper and the polyester film at room temperature to 200° C., wherein the temperature for laminating and bonding is not higher than the glass transition temperature of the polyester film, under a line pressure of 200 kgf/cm or higher with a pair of pressing rolls.

10. The method according to claim 7, further comprising providing a second aramid paper comprising aramid fibers and aramid pulp, the second aramid paper having been subjected to a plasma surface treatment, and wherein the step of laminating and bonding comprises laminating and bonding the aramid paper and the second aramid paper to opposed sides of the polyester film to provide a laminate that has a three-layered structure of aramid paper-polyester film-aramid paper.

11. The method according to claim 7, wherein the polyester is polyethylene terephthalate or polyethylene naphthalate.

12. The method according to claim 7, wherein the rolls are made of rigid material.

13. The method according to claim 7, wherein the rolls have a flexure compensating device of roll bending type, thereby to compensate flexure of the rolls.

14. The method according to claim 7, wherein at least the rolls are placed in an atmosphere in which temperature is controllable.

* * * * *